US006887390B2

(12) United States Patent
Mohedas et al.

(10) Patent No.: US 6,887,390 B2
(45) Date of Patent: May 3, 2005

(54) OPTIMIZED SOLID/LIQUID SEPARATION SYSTEM FOR MULTIPHASE CONVERTERS

(75) Inventors: Sergio R. Mohedas, Ponca City, OK (US); Rafael L. Espinoza, Ponca City, OK (US); Doug S. Jack, Ponca City, OK (US); Oluwasei A. Odueyungbo, Ponca City, OK (US); James Dale Ortego, Jr., Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/417,307

(22) Filed: Apr. 16, 2003

(65) Prior Publication Data

US 2003/0232894 A1 Dec. 18, 2003

Related U.S. Application Data

(60) Provisional application No. 60/372,961, filed on Apr. 16, 2002.

(51) Int. Cl.$^7$ ............................ B01D 19/00; B01D 24/46
(52) U.S. Cl. ........................ 210/777; 210/791; 518/705
(58) Field of Search ........................ 210/777, 778, 210/791–794, 193; 518/700, 705, 713

(56) References Cited

U.S. PATENT DOCUMENTS

| | | | |
|---|---|---|---|
| 2,738,880 A | 3/1956 | Whitney | 210/197 |
| 4,605,678 A | 8/1986 | Brennan et al. | 518/700 |
| 5,407,644 A | 4/1995 | Rytter et al. | 422/147 |

(Continued)

FOREIGN PATENT DOCUMENTS

| | | | |
|---|---|---|---|
| WO | WO 99/64380 | 12/1999 | C07C/1/04 |
| WO | WO 03/004582 | 1/2003 | C10G/2/00 |

OTHER PUBLICATIONS

Bechtel Corporation; *Alternative Fuel and Chemicals from Synthesis Gas*; Prepared for Air Products and Chemicals, Inc.; Subcontract No. PT5781–B; May 1996 (pp. i–A5–3).
R. L. Espinoza, et al; *Use of Membranes in Fischer–Tropsch Reactors*; Studies in Surface Science and Catalysis 130; 2000 Elsevier Science B.V.; (pp. 389–294).
Mott Corporation Process Systems; *Unique Porous Media. Process Filtration Expertise. Limitless Possibilities*; (undated); (pp. 12).
[online]: Retrieved from the Internet on Mar. 26, 2003: <URL: http://domino.pal.com/wwwih%20catalog.nsf/89c31b38ff78fe1c852566d40033209e/3b3096bad...Backwash Filtration Systems; (3 pp.).
[online]: Retrieved from the Internet on Mar. 26, 2003:<URL: http://www.pall.com/applicat/hcp/backwash.asp ; *Pall Backwash Systems*; (pp. 3)r.
[online]: Retrieved from the Internet on Mar. 26, 2003:<URL: http://domino.pall.com/www/pi+catalog.nsf/AB761EE7F8FEB25A852564730010BD3C/7DA099.. *Pall Backwash Filtration Systems*; (pp. 3).
Pall Life Sciences; *Pall Backwash Filtration Systems*;(undated); (pp. 2.
PCT International Scarch Report for Appln. No. PCT/US03/11662, dated Dec. 5, 2003; (4 p.).

Primary Examiner—Fred G. Prince
(74) Attorney, Agent, or Firm—Conley Rose P.C.

(57) ABSTRACT

Methods for producing clean liquid/wax products from a slurry used in a Fischer-Tropsch reactor are disclosed. In general, one embodiment of the present invention comprises a solid/liquid filtration system having a filter medium comprising a substrate and a filter cake deposited on the substrate, wherein the filter cake is generated by deposition of solids from the slurry. The thickness of the filter cake can be maintained within a desired range by controlling the slurry velocity and/or the pressure differential across the filter medium. This invention relates to a method of operation of such filtration system which increases filtration cycle time and improved filtrate quality resulting in very low solid content in filtrate.

70 Claims, 5 Drawing Sheets

U.S. PATENT DOCUMENTS

| | | | |
|---|---|---|---|
| 5,422,375 A | 6/1995 | Rytter et al. | 518/700 |
| 5,520,890 A | 5/1996 | Lorentzen et al. | 422/197 |
| 5,527,473 A | 6/1996 | Ackerman | 210/767 |
| 5,599,849 A | 2/1997 | Jager et al. | 518/700 |
| 5,770,629 A | 6/1998 | Degeorge et al. | 518/700 |
| 5,811,469 A | 9/1998 | Leviness et al. | 518/700 |
| 5,827,903 A | 10/1998 | White et al. | 518/710 |
| 5,844,006 A | 12/1998 | Jager et al. | 518/700 |
| 5,900,159 A | 5/1999 | Engel et al. | 210/788 |
| 5,948,383 A * | 9/1999 | Kuznicki et al. | 423/700 |
| 5,962,537 A | 10/1999 | Leviness | 518/700 |
| 6,068,760 A | 5/2000 | Benham et al. | 208/950 |
| 6,069,179 A | 5/2000 | Rytter et al. | 518/700 |
| 6,096,789 A | 8/2000 | Clerici et al. | 518/706 |
| 6,217,830 B1 | 4/2001 | Roberts et al. | 422/140 |
| 6,344,490 B1 | 2/2002 | DeGeorge et al. | 518/700 |
| 6,462,098 B1 * | 10/2002 | Vogel et al. | 518/700 |
| 2004/0050806 A1 * | 3/2004 | Espinoza et al. | 210/806 |

* cited by examiner

OPTIMIZED SOLID/LIQUID SEPARATION SYSTEM FOR MULTIPHASE CONVERTERS

CROSS-REFERENCE TO RELATED APPLICATIONS

The present application claims priority to U.S. Provisional Application No. 60/372,961, filed Apr. 16, 2002, titled "Solid/Liquid Separation System for Multiphase Converters," the entirety of which is hereby incorporated by reference herein for all purposes.

STATEMENT REGARDING FEDERALLY SPONSORED RESEARCH OR DEVELOPMENT

Not applicable.

TECHNICAL FIELD OF THE INVENTION

The present invention relates generally to methods and apparatus for removing liquid/wax products from a slurry used in a Fischer-Tropsch reactor. Particularly this invention relates to methods of operating a filtration system with better filtrate quality, and longer filtration cycle times. The present invention also includes a method to remove the cake, at least partially, without compromising the filtrate quality during the next filtration cycle and minimizing the need of traditional backwash or blowback cleaning methods.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due, in part, to the large volume occupied by a gas. Because the volume of a gas is so much greater than the volume of a liquid containing the same number of gas molecules, the process of transporting natural gas by means other than pipelines typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more economically than natural gas, since they do not require energy, equipment, and expense for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

Typically the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

Common reactors include packed bed (also termed fixed bed) reactors, fluidized bed reactors and slurry bed reactors. Originally, the Fischer-Tropsch synthesis was carried out in packed bed reactors. These reactors have several drawbacks, such as temperature control, that can be overcome by gas-agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Gas-agitated multiphase reactors, or slurry bubble column reactors (SBCRs), inherently have very high heat transfer rates, and therefore, reduced reactor cost. This, and the ability to remove and add catalyst online are some of the principal advantages of such reactors as applied to the exothermic Fischer-Tropsch synthesis. Sie and Krishna (Applied Catalysis A: General 1999, 186, p. 55), incorporated herein by reference in its entirety, give a history of the development of various Fischer Tropsch reactors.

One of the critical design considerations in a SBCR is the recovery of usable liquid products (commonly called waxes in this context) from the reactor slurry. The recovered waxes need to be generally free of catalyst particles before being further processed into commercial products. One problem with the removal of usable liquid products, however, is that catalyst particles are dispersed in the liquid and must be separated from the slurry. It is also often desired to return substantially all of the catalyst particles to the reactor in order to maintain a constant inventory of catalyst in the reactor.

In order to reduce catalyst loses and minimize replacement costs, it is highly desirable to obtain a wax product with a minimum solid content from a Fischer-Tropsch slurry reactor. Some of the early work on catalyst/wax separation techniques involved placing a filter on an external slurry circulation loop is described in an article by M. D. Schlesinger, J. H. Crowell, Max Leva and H. H. Storch titled "Fischer-Tropsch Synthesis in Slurry Phase" from the U.S. Bureau of Mines (Engineering and Process Development, Vol. 43, No. 6, page 1474 to 1479, June 1951). Several methods, such as filtration, magnetic separation and settling, are disclosed in "Status Review of Fischer-Tropsch Slurry Reactor/Catalyst Wax Separation Techniques" prepared for the U.S. Department of Energy, Pittsburgh Energy Technology center by P. Z. Zhou, Burns and Roe Services Corporation, February, 1991. These methods have been developed for separating catalyst particles from Fischer-Tropsch wax but have proved less than ideal or were not deemed commercially viable.

In a commercial SBCR, the severe hydrodynamic conditions inside the reactor, coupled with the desired long lifetime of the catalytic material, can result in catalyst attrition. In the case of some attrition-prone catalyst particles, as the catalyst particles break down over time, sub-particles of various sizes may be created, including very small particles known as "fines," some of which may even be sub-micron in size. The presence of fines in the reactor tends to greatly reduce the effectiveness of the catalyst-liquid separation system.

In a catalyst-liquid separation system utilizing filtration, the frequency of the backwashing operations affects the solids content of the filtrate thus the filtrate quality. The higher the backwashing frequency the poorer the quality of the filtrate. This is because at the beginning of the filtration cycle, which follows the backwashing and before the cake is established, many particles of size smaller than the substrate nominal opening will traverse it and therefore degrading the filtrate quality.

Thus, there remains a need in the art for methods and apparatus to improve the removal of wax products from a slurry with a high solids content, such as a Fischer-Tropsch slurry. Therefore, the embodiments of the present invention are directed to methods and apparatus, for improved operation of a filtration system for recovering an improved-quality product from a slurry and to extend cycle times of the filtration system, that seek to overcome these and other limitations of the prior art.

SUMMARY OF THE PREFERRED EMBODIMENTS

Accordingly, there are provided herein methods and apparatus for removing wax products from a slurry used in a Fischer-Tropsch reactor. The preferred embodiments of the present invention are characterized by a solid/liquid separation system that continuously removes liquid products from a slurry containing the liquid products and solid particles. The solid/liquid separation system has a slurry chamber and a filtrate chamber separated by a filter medium. The slurry chamber has an inlet and an outlet to provide for the flow of slurry through the chamber at a predetermined flow rate. The filtrate chamber includes a filtrate outlet and is preferably maintained at a pressure lower than the pressure in the slurry chamber. The separation is effected by drawing the fluid across a filter medium composed of a filter cake disposed on a substrate, so that the cake filter performs the substantial majority of the filtration activity. The thickness of the filter cake can be maintained within a desired range by controlling the slurry velocity and/or the pressure differential across the filter medium. As used herein, the slurry linear velocity is calculated by the ratio of the slurry volumetric flow rate to the cross-sectional area of the slurry chamber available for slurry flow before forming the cake. The substrate is preferably a cylindrical filter element having a central axis parallel to the slurry velocity.

The filtration method according to this invention is different than a method known as cross-flow filtration, where a cake is not needed, and furthermore is avoided or 'barely' tolerated. Moreover, in this invention the resulting fluxes are much higher than the fluxes associated with cross-flow filtration, thereby making it more efficient in product recovery and more cost effective. This filtration method is also different from a method known as dead-end filtration, as the filtration in this invention can be operated in a continuous manner and is well suited for high solid content.

The embodiments of the present invention provide a filtration system that provides enhanced filter life and performance while being resistant to the deleterious effects of fine catalyst particles bypassing the filter medium and contaminating the liquid products. The enhanced filter life and performance results at least in part from the less-frequent use of backwashing or blowback. Typically, at the beginning of a backwash, some fines can pass through the substrate, resulting in an increased probability of clogging the substrate and causing a degradation in the quality of the filtrate in terms of solids content. By minimizing the frequency of backwashes, the presence of fines inside the substrate is less prominent and therefore the probability of fines into the filtrate is lessened. The present invention also relates to the filtrate product obtained from such methods, which is characterized by an improved quality and a very small solid content.

When the filtrate flow rate or flux (flux defined as filtrate flow rate divided by the area of substrate) is below a determined level, it may become necessary to restore the filtrate flow to a more desirable value. The restoration of filtrate flow can be achieved by reducing the cake thickness. To remove some or all of the cake, any known cleaning method or combination of methods which use a reverse flow of fluid (gas, liquid, or combinations) such as backwashing or blowback can be used. Alternatively, the applicants discovered a novel technique for cleaning the substrate that comprises stopping the filtration flow for a short period of time, maintaining constant slurry flow through the slurry chamber, and resuming filtration rate to a more desirable level. This technique will result in a reduction or minimization of the backwash frequency. Any combination of these cleaning methods or any alternation of techniques is also contemplated in this invention.

As the filter cake thickness increases, the flow area through the slurry chamber in which the slurry enters decreases, causing a corresponding increase in the slurry velocity and an increase in pressure differential across the filter medium, while decreasing the filtration rate. In this condition, the flow rate of slurry can be increased to further increase the slurry velocity so as to erode the filter cake and decrease the cake thickness. It has been discovered that a velocity of greater than 5 feet/second (ft/sec) across the filter cake will result in a loss of cake thickness and stability.

Therefore, by periodically increasing the linear velocity of the slurry entering the filtration system for a short period of time, the cake thickness will decrease, thus increasing the filtrate flow through the filter medium and resulting in an extended period of time between backwashes or blowbacks. By maintaining a slurry velocity of at least 0.3 ft/sec and not more than 5 ft/sec combined with a pressure differential across the filter medium of not more than 30 psi (207 kPa), preferably not more than 15 psi (103 kPa), and most preferably not more than 5 psi (34 kPa), the filtration cycle time can be extended to several hours between cleanings, such as backwashes, blowbacks, or other cleaning techniques.

A preferable filtration system provides for a filtration rate of at least 0.2 gallons per minute per square foot of filter area, or gpm/ft$^2$, (about 490 L/m$^2$/hr) and as much as 8 gpm/ft$^2$ (about 19,600 L/m$^2$hr) or more. In some embodiments the filtration rate is greater than 0.4 gpm/ft$^2$, preferably between 0.4 gpm/ft$^2$ to 8.0 gpm/ft$^2$. The slurry exiting the filtration system through the outlet has between 1 and 30%, and preferably between 2 and 10%, less liquid content than the slurry entering the system. The production and efficiency of the filtration system can be controlled by varying the flow rate of slurry through the system and/or the pressure differential between the slurry chamber and the filtrate chamber.

In some embodiments, the flow rate of slurry can be increased by recycling a portion of the filtrate back through the filtration system. Slurry flow rate may also be increased by additional slurry from the reactor or by recycling filtered slurry through the filtration system. One preferable filtration system is supplied by a slurry that is gravity-fed from an SBCR. In another embodiment, a separation system includes parallel separation units. Individual separation units can be taken off-line to be cleaned or maintained while filtration is continued with the other units. Slurry flow to one unit can also be partially or completely diverted to the other unit in order to control the flow rate of slurry to one or both units.

In another embodiment, the filtration system is coupled with a settler so that the method for operating the filtration system includes flowing the slurry to a settler. The settler is used to extract a portion of the slurry containing a high concentration of large diameter particles, which is then passed through a filter housing comprising a slurry chamber and a filtrate chamber separated by a filter medium. The large diameter particles are deposited on the substrate to form a filter cake that has a thickness and provides a substantial majority of the filtration activity. The cake formed primarily from large diameter particles allows for greater permeability and filtrate flux than is available from a conventionally formed cake. The flow of slurry is then shifted to bypass the settler and passed through the filter housing so as to permeate a portion of the slurry liquid phase through the filter cake and the substrate to generate a filtrate flux. The thickness and continued operation of the filter cake can then be regulated by any of the above described methods.

Thus, the present invention comprises a combination of features and advantages that enable it to substantially increase efficiency of removing liquid products from a slurry having a high solids concentration. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for removing liquid wax products from a slurry having a heavy solids content. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different methods and apparatus for removing wax products from a slurry. It should be understood that, while reference may be made to particular substrates, any permeable or porous substrate may be used. Suitable substrate materials may include, sintered powder metal, sintered woven wire-mesh, wedge wire, porous metal fiber, and metal supported membranes. It is to be fully recognized that the different teachings of the embodiments discussed below may be employed separately or in any suitable combination to produce desired results.

As used herein, the number average particle size, $D_{avg}$, is defined by Equation (1) to be the summation over the total number of particles, of the relative frequency of particles of size i, $f_i$, times the diameter of particles of size i, $d_i$.

$$D_{avg} \equiv \sum_{i=1}^{N} f_i d_i \tag{1}$$

The relative frequency of particles of size i, $f_i$, is determined in Equation (2) by dividing the number of particles of size i, $n_i$, by the total number of particles, N.

$$f_i \equiv \frac{n_i}{N} \quad (2)$$

Figure 1:
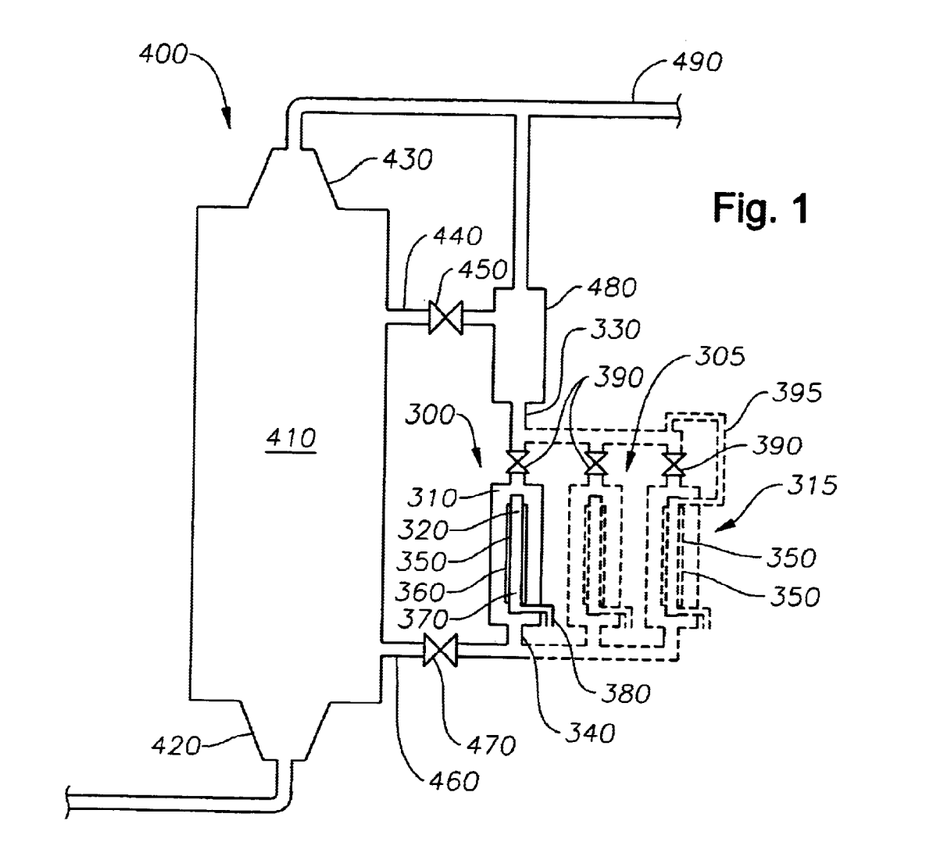
FIG. 1 is a schematic view of one embodiment of an SBCR and filtration system having filtrate recycle.

FIG. 1 shows a schematic representation of a solid/liquid separation system 300 having a slurry chamber 310 and a filtrate chamber 320. Slurry chamber 310 has inlet 330 and outlet 340. Filtrate chamber 320 is disposed within slurry chamber 310 and at least a portion of chamber 320 is constructed of filter medium 350. Filter medium 350 includes filter cake 360 formed on substrate 370. Filtrate chamber 320 also has filtrate outlet 380, the flow through which is controlled by a valve (not shown).

Syngas, containing hydrogen and carbon monoxide, is fed through inlet 420 into reactor vessel 410, which contains a solid catalyst suspended in a slurry. The catalyst may preferably include cobalt, ruthenium, or iron on a support of alumina, silica, titania, zirconia, or combinations thereof. As the syngas travels through reactor 410, the reactants (hydrogen and carbon monoxide) are absorbed into the slurry and diffuse to the catalyst where they are converted to gaseous and liquid (wax) products. The gaseous products are removed from reactor 410 through outlet 430. The wax products mix with the slurry. An exemplary reactor system is described in U.S. patent application Ser. No. 10/023,258, titled "Slurry Bed Reactor Operated in Well-Mixed Gas Flow Regime," the entirety of which is hereby incorporated by reference herein for all purposes.

A fraction of the particles making up the solid phase of the slurry may have a size smaller than the nominal rating of the substrate. In one preferred embodiment, the solid catalyst suspended in the slurry has a particle size distribution between 1 and 250 um. In one preferable slurry, 95 weight percent of the catalyst particles are between 10 and 200 um with a number average particle size between 20 and 50 um. The solid particles form between 5 and 25 volume percent of the slurry.

Slurry leaves reactor 410 through outlet 440 and enters degassing unit 480 where residual gas is removed through outlet 490. The slurry flow into or out of reactor 410 may be gravity driven or controlled by a pump. The degassed slurry then enters separation system 300 through inlet 330. As the slurry flows through slurry chamber 310 a pressure differential across filter medium 350 causes a portion of the liquid products contained in the slurry to permeate into filtrate chamber 320. The filtrate entering filtrate chamber 320 is substantially free of solid catalyst particles and is removed through outlet 380. The remainder of the slurry, which now contains approximately 1 to 30% less liquid, is recycled back into reactor 410 through outlet 340 and inlet 460.

As previously discussed, the flow of filtrate through slurry chamber 310 can be regulated to adjust the flow rate of slurry over the filter medium 350. This flow rate can be adjusted by opening one or more of valves 390 to increase the flow of slurry to an individual slurry chamber, by adjusting the flow through valve 450 or 470 to control the flow to the entire filtration system, by adding a supplemental liquid stream (not shown) to mix with slurry entering the chamber 310, or by recycling a portion of the filtrate through a recycle line 395, with the help of a pump (not shown), to mix with slurry entering the chamber 310. The supplemental liquid stream preferably would contain compounds compatible with the overall process, for example a stream comprising naphtha, diesel range hydrocarbons, hydrocarbons such as found in the filtrate stream 380 that will remain liquid at reactor conditions, or combinations thereof.

The slurry velocity may also be controlled by the design of the solid/liquid separation system 300 and by the slurry circulation loop that circulates slurry to and from the reactor. The slurry velocity may be also be varied by means of a slurry pump, not shown. Other methods and apparatus for operating and regulating a solid/liquid separation system are discussed in concurrently filed patent application Ser. No. 10/414,636, titled "Solid/liquid Separation System or Multiphase Converters," the entirety of which is hereby corporated by reference herein for all purposes.

According to some embodiments of this invention, the filtration system using a filter cake has the benefit of having longer filtration cycle and also results in recovering a filtrate with improved quality. This extended cycle time will reduce the number of backwashes and/or blowbacks, which are believed to be detrimental to the lifetime of the substrate.

When the filtrate flow is below a determined level, it may become necessary to remove some or all of the cake to reduce or eliminate its thickness by any known cleaning methods which uses a reverse flow of fluid (gas, liquid, or combinations) such as backwashing or blowback. The Applicants discovered a novel technique for cleaning of the a substrate that comprises of stopping the filtrate flow for a short period of time, preferably between about 0.5 min to about 120 minutes, more preferably between 1 min and 30 minutes, and most preferably between 2 min and 15 minutes, while maintaining slurry flow through the slurry chamber, and resuming filtrate flow to a higher more desirable level. It is believed that some of the cake thickness is removed by stopping the filtrate flow. This cake erosion, even if partial, restores a filtration flow within a desirable range of fluxes.

Figure 5:
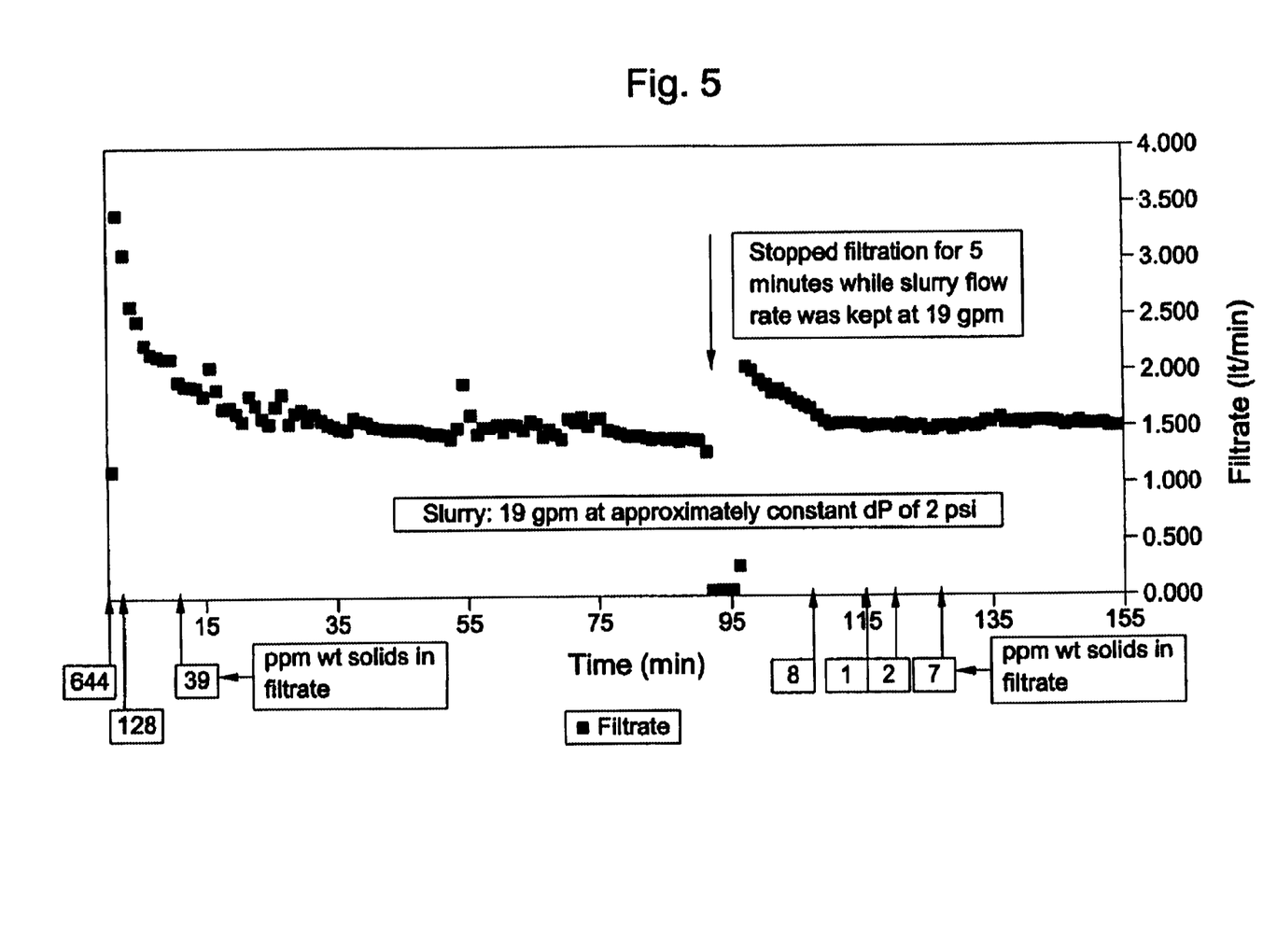
FIG. 5 is one embodiment of a novel method for cleaning of a substrate to remove at least a portion of the cake according to this invention; it also shows the quality of the filtrate in terms of solids content during the duration of the experiment.

This technique can be used alternatively or in conjunction with conventional cleaning techniques of filters such those listed above. This method does not result in a surge of solid content in the filtrate after the surface cleaning time is terminated. The time necessary for the intermittent interruption of filtrate flow should last not more than 5% of the overall filtration cycle length, preferably not more than 3% of the overall filtration cycle length. An overall filtration cycle wash is defined as the period between two cleanings, whether these techniques are conventional backwash, blowback, or the cleaning technique disclosed in this invention. Also the higher frequency of backwashes leads to poorer filtrate quality over time due to relatively high amount of solids particles traversing the substrate every time a new cake is being formed, as shown in FIG. 5. Similar results can also be achieved by periodically increasing the slurry linear velocity for a short period of time without stopping the filtrate flow.

Regardless of the general configuration of a solid/liquid separation system constructed in accordance with the current invention, it is understood that the specific design of the system is dependant on the characteristics of the slurry to be processed. The parameters of a separation system that may be varied for a particular slurry composition include, but are not limited to, the solid particle size distribution, the permeability of the substrate, the nominal rating or nominal size of the openings in the substrate, the flow rate of slurry through the system, the size of the slurry chamber and the filtrate chamber, the pressure drop across the filter medium, and the flow rate of filtrate out of the system.

Referring again to FIG. 1, for the purpose of discussion only, and by way of an example, the operation of solid/liquid separation system 300 will be described as a component of Fischer-Tropsch reactor system 400. Reactor system 400 includes reactor vessel 410 which has a gas inlet 420, gas outlet 430, slurry inlet 460, and slurry outlet 440. Valves 450 and 470, respectively, control the flow of slurry out of and into vessel 410. System 400 also includes degassing unit 480, gas outlet 490, and solid/liquid separation system 300. System 400 may also optionally include additional separation systems 305 and 315. Syngas, containing hydrogen and carbon monoxide, is supplied by inlet 420 into reactor vessel 410, which contains a solid catalyst suspended in a slurry. As the syngas travels through reactor 410, the reactants (hydrogen and carbon monoxide) are absorbed into the slurry and diffuse to the catalyst where they are converted to gaseous and liquid (wax) products. The gaseous products are removed from reactor 410 through outlet 430. The wax products mixed with solid particles in the slurry need to be separated out.

The feed gases charged to the process of the invention comprise hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably the hydrogen is provided by free hydrogen, although some Fischer-Tropsch catalysts have sufficient water gas shift activity to convert some carbon monoxide and water to carbon dioxide and hydrogen for use in the Fischer-Tropsch process. It is preferred that the molar ratio of hydrogen to carbon monoxide in the feed be greater than 0.5:1 (e.g., from about 0.67:1 to 2.5:1).

It is also preferred that when cobalt, nickel, iron, and/or ruthenium catalysts are used, the feed gas stream contains hydrogen and carbon monoxide in a molar ratio of about 1.4:1 to 2.3:1. The feed gas may also contain other gases, known as inerts, that are considered inert at reaction conditions. Examples of inerts are nitrogen and light gaseous hydrocarbons, like methane. The feed gas stream should contain a low or no concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The catalyst used in the Fischer-Tropsch reactor system 400 comprises any suitable supported or precipitated catalyst active in the Fischer-Tropsch synthesis, such as a catalytically active metal from Groups 8, 9, and 10 of the Periodic Table of the Elements, New Notation, as found in, for example, the CRC Handbook of Chemistry and Physics, 82nd Edition, 2001–2002, and used throughout this specification as the reference for all element group numbers. The catalyst preferably contains cobalt, nickel, iron or ruthenium. For cobalt, the catalyst preferably contains about 5 to 75 wt % cobalt and more preferably from about 10 to about 60 wt % cobalt. For iron, the catalyst preferably contains about 10 to 95 wt % iron, and more preferably from about 20 to about 85 wt % iron. For ruthenium, the catalyst preferably contains about 0.5 to 10 wt % ruthenium and more preferably from about 1 to about 6 wt % ruthenium.

The catalyst may contain additionally one or more promoters comprising a metal selected from Group 1–17. A promoter metal is preferably selected from Group 1 (Li, K), 7 (Re), 8 (Ru, Os), 9 (Co, Rh, Ir), 10 (Ni, Pd, Pt), 11 (Cu, Ag), and 13 (B, Al). If a catalyst support is used, the support preferably comprises unmodified, stabilized or modified alumina, silica, titania, zirconia, or combinations thereof. More preferably the catalyst support comprises alumina or silica-alumina. Cobalt catalysts are most preferred as they have a high activity and selectivity for the Fischer-Tropsch synthesis. A cobalt catalyst using stabilized or modified alumina is highly preferred when it is stabilized by using structural promoters and/or when it is derived from Boehmite or a boehmitic support. The feed gas is contacted with the catalyst in a reaction zone. Mechanical arrangements of conventional design may be employed as the reaction zone including, for example, fluidized bed, slurry bubble columns or ebulliating bed reactors, among others. Accordingly, the preferred size and physical form of the catalyst particles may vary depending on the reactor in which they are to be used.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per hour per reaction zone volume. The volume of reactant gases is at a standard pressure of 101 kPa, and standard temperature of 0° C. The reaction zone volume is defined by the portion of the reaction vessel volume where reaction takes place and which is occupied by a gaseous phase comprising reactants, products and/or "inerts"; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psia (552 kPa) to about 1000 psia (6895 kPa), more preferably from 80 psia (552 kPa) to about 600 psia (4137 kPa), and still more preferably, from about 140 psia (965 kPa) to about 500 psia (3447 kPa).

A filtration system to support a commercial Fischer-Tropsch reactor may preferably comprise a plurality of individual filtration assemblies constructed in accordance with the described embodiments. The flow of slurry from the reactor can then be divided among the plurality of filtration assemblies so that the quality of the slurry in the reactor can be continuously maintained without shut down of the system. Having a plurality of filtration assemblies allows individual assemblies to be taken off-line periodically so that the substrate for each shut-down filtration assembly can be cleaned or replaced as required. The substrate used in the above described embodiments is preferably cleaned by filling the inner conduit with a liquid or gas that is at a higher pressure than the slurry, therefore forcing solid particles out of the substrate and collapsing the cake that might have grown too thick during an extended period of operation. Thus, a new cycle can be started. It should be noted that different types of substrates could be used if necessary. It should also be understood that each individual filter housing may have its own slurry flow rate control system, or a combination of filter housings could share one slurry flow rate control system. At times a chemical or ultrasonic cleaning of the substrate may be needed.

EXAMPLES

Figure 2:
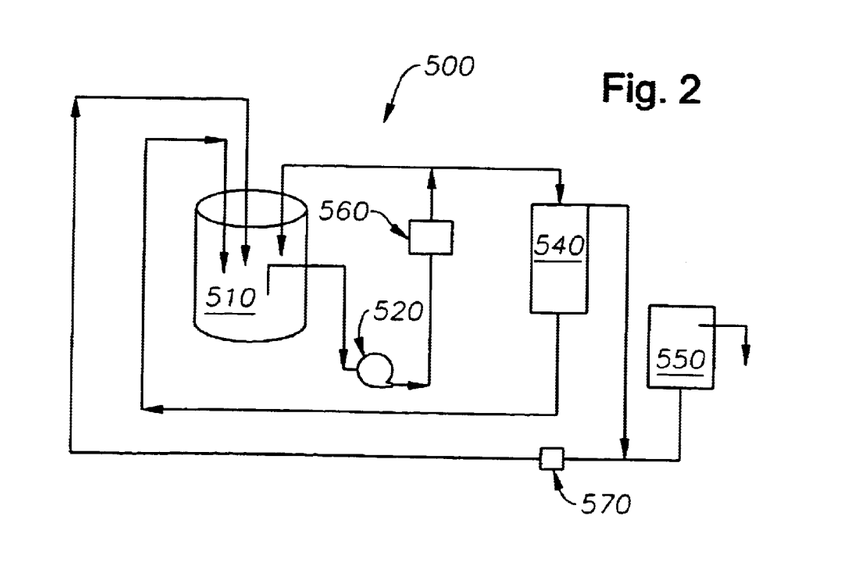
FIG. 2 represents a laboratory setup used to test a filtration system according to one embodiment of this invention.

Experiments were conducted using the laboratory setup 500 described in FIG. 2. A slurry was formed in a slurry mixing tank 510. The slurry was a mixture of model wax (n-decane) and solid particles of a cobalt-based catalyst. The cobalt-based catalyst is supported on an alumina material and is active in the Fischer-Tropsch reaction. The solid concentration in the slurry was approximately 23–25% by weight (or about 10% by volume). The catalyst particle size when the catalyst was fresh and first loaded in the slurry mixing tank 510, was in the range of 20 to 150 microns An agitator (not shown) placed inside slurry mixing tank 510 was used to maintain the solids suspended in the slurry. A slurry pump 520 sent a portion of the slurry from slurry mixing tank 510 either back to the slurry mixing tank 510 or to a filtration housing 540. A valve (not shown) was used to direct the slurry flow to the appropriate location. The filtration housing 540 comprises a substrate. The substrate was a 1" outer diameter, 20 inch long, porous metal membrane of the sintered woven wire-mesh or sintered powder metal type with average openings, i.e. a nominal rating, of approximately 20 microns. The substrate was placed concentrically in the filter housing made from a pipe. The filtrate and the slurry exiting the filtration housing 540 were recycled to slurry mixing tank 510. At times all of the filtrate coming from the filtration housing 540 was routed to storage tank 550 which could be used for backwashing purpose. A valve (not shown) was used to direct the filtrate flow to either to the slurry mixing tank 510 or to storage tank 550. Flow meters such as those represented by labels 560 and 570 were used to measure the slurry and filtrate flow rates respectively. The experiments were performed at a room temperature of approximately 70° F. (ca. 21° C.). Constant trans-membrane differential pressure (dP) of 2 and 3 psi were used.

Figure 3:
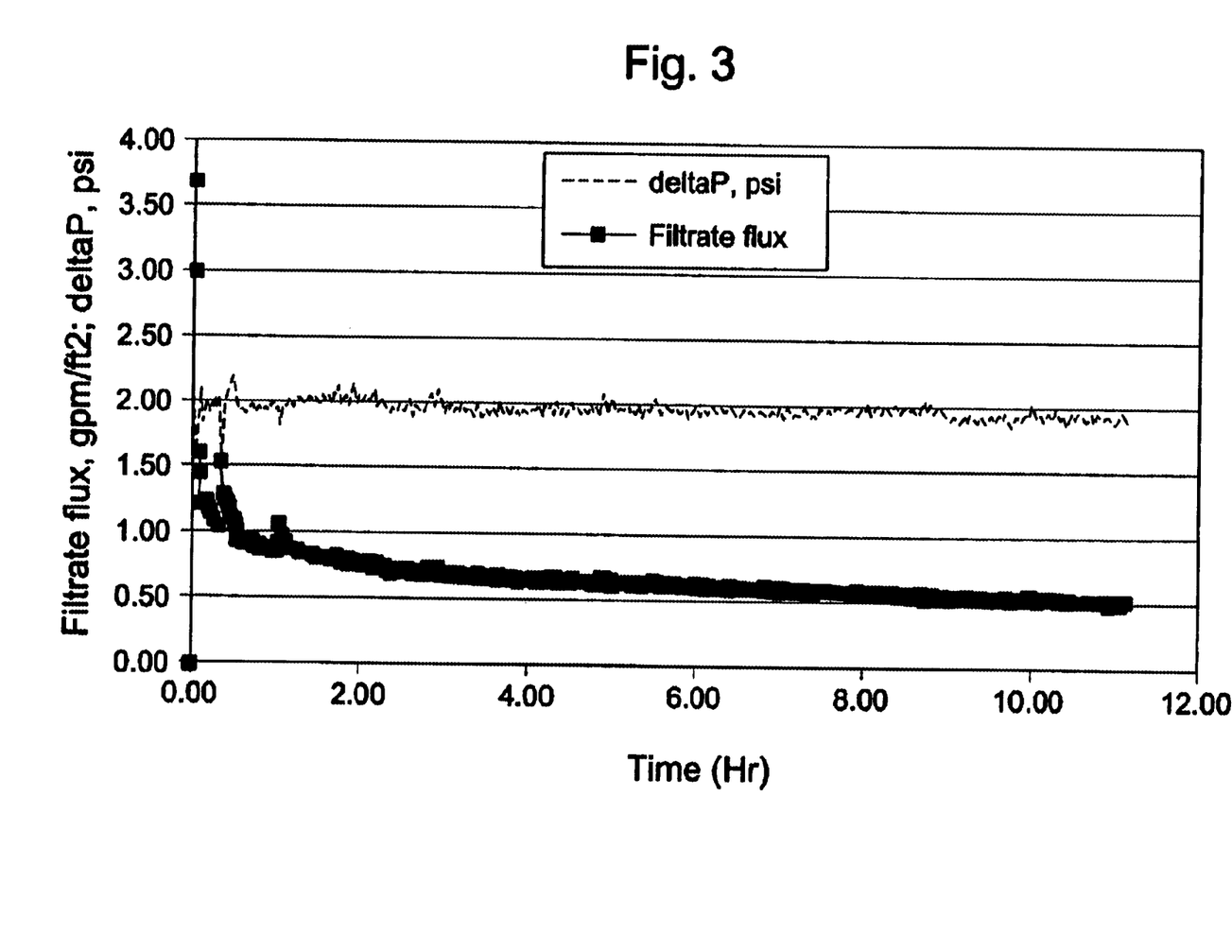
FIG. 3 represent the filtrate flow rate over time on stream at a given slurry velocity and a relatively constant pressure differential of 2 psi using a 20 microns nominal rating substrate.

In the example of FIG. 3 the slurry flow rate was maintained at 15.5 gpm for a corresponding slurry linear velocity of 0.8 ft/s. The substrate was a porous metal membrane with an average opening or nominal rating of approximately 20 microns placed in a 3" nominal diameter housing. The solid content of the slurry was 23.4% by weight. Results on filtrate flow is shown in FIG. 3. Constant trans-membrane differential pressure (dP) of 2 psi was used.

FIG. 3 shows the filtrate flow variation with run time. Initially, the filtrate flux was high because the filter cake was starting to form. The flux decreased as the cake thickness increased until when the shear stress due to the flowing slurry, and acting at the cake-slurry interface, balanced the force(s) holding the catalyst particles onto the cake. A cake of uniform thickness was thus formed. Compaction of cake, rearrangement of cake particles and fines inclusion accounted for the gradual filtrate flow decline before attaining a steady value. The steady value of the filtrate flow, or the steady state flow, was virtually maintained for the remaining duration of run (over 9 hrs). Correspondingly, the filtrate quality of less than 10 ppm of solids was maintained over this period. The filtrates at the initial period of run contained higher ppm of solids. This confirmed that the filter cake, once formed and steady, performed the filtration and resulted in high filtrate quality. Filtrate solids content of greater than 20 ppm by weight solids was measured during the cake formation stage Actually, the solid content in the filtrate was as high as 150 ppm by weight in some runs during the initial cake forming period and when the cake was lost. The steady state filtration flux for this demonstration runs ranged from 0.5 to 1.0 gpm/ft$^2$.

Figure 4:
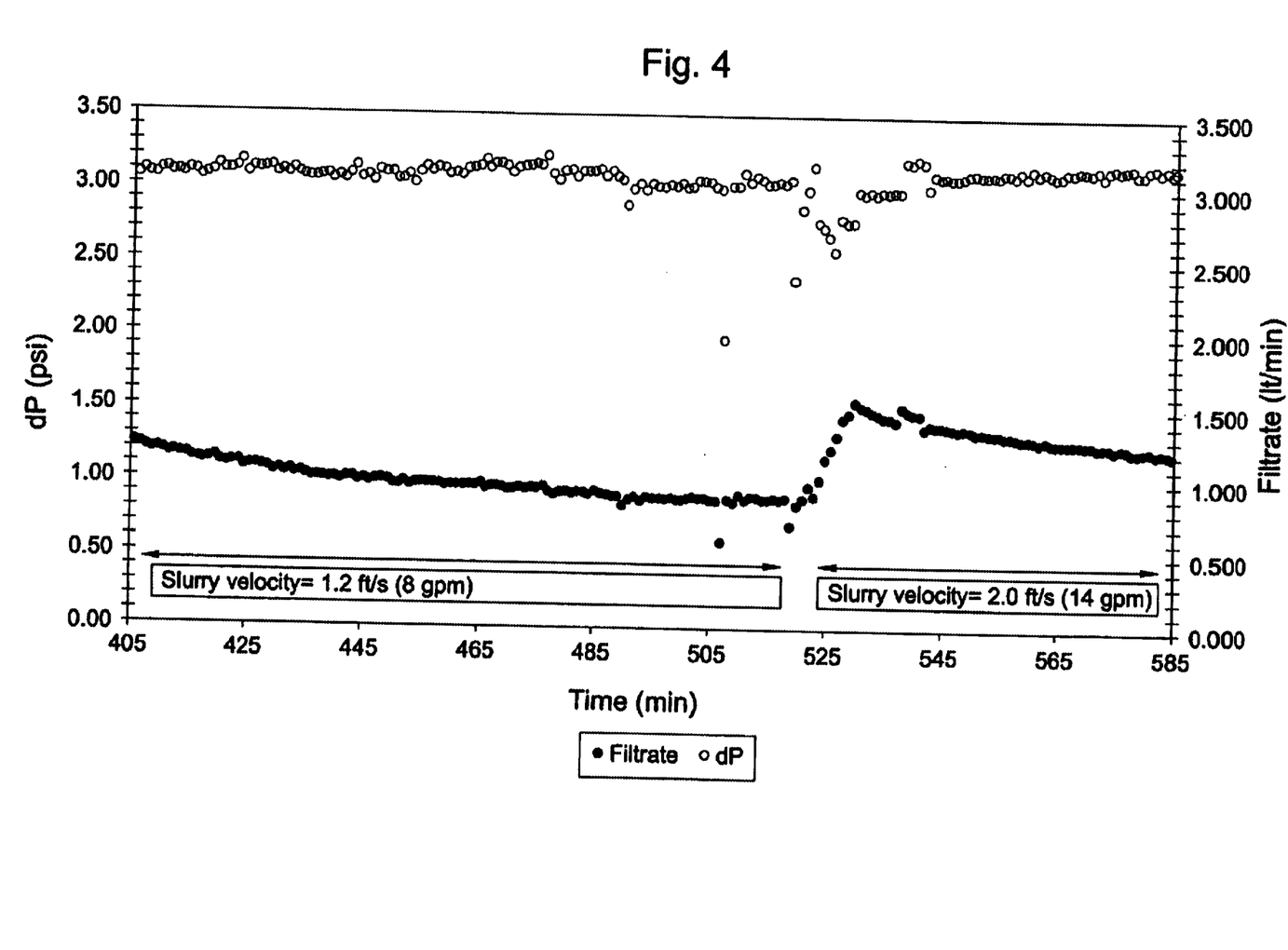
FIG. 4 shows the effect of slurry velocity on filtrate flow rate.

FIG. 4 shows the change in filtrate flow by changing the slurry linear velocity. This is in agreement with the principles of the invention disclosed in our concurrently filed patent application Ser. No. 10/414,636, titled "Solid/liquid Separation System for Multiphase Converters," which has been incorporated by reference herein. This principle can also be applied to increase the time in between backwashing operations. By periodically increasing the linear velocity of the slurry for short periods of time, the maximum cake thickness can be controlled and therefore maintaining a higher average filtration flux (filtrate flow rate) during the length of the filtration cycle (during the time in between backwashing operations).

FIG. 5 similarly to example in FIG. 3, shows that initially, the filtrate flow was high and as the filter cake begun to build up and its thickness increased, the filtrate flow decreased. The solids content of the filtrate at the very beginning of the filtration time was as high as 644 ppm by weight indicating the substrate was allowing some of the particles to pass through. As the cake started to build up, the filtrate quality rapidly improved after a few minutes as the solids content dropped to 128 ppm after 3 minutes and 39 ppm after 12 minutes, to finally stabilize below 10 ppm.

FIG. 5 also illustrates quite well how the new cleaning method can be used during operation of the cake filtration. When the filtrate flow dropped below 1.3 L/min, the filtration flow was stopped for 5 minutes while the slurry flow was maintained at 19 gpm. As a result of the filtration interruption, the pressure differential dropped (not shown in FIG. 6) between the filter chamber and the filtrate chamber thereby resulting in loosening the cake as there is less or no force to retain its compaction. Once the filtration was resumed, the filtration flow was increased to 2.05 L/min, demonstrating that some of the cake was indeed removed. It should be observed that since the filtrate flow after interruption of filtration did not return to the initial filtrate flow of about 3.4 L/min obtained at time 0, the cake was not entirely removed. It should be noted that the stability of the filtration flux (filtrate flow arte) after the interruption in filtration improved as compared to the period just before the interruption. Since the cake is not entirely removed, the solid content of the filtrate was still below 10 ppm by weight. This shows that the method of controlling the cake presented in this invention achieves an increased flux and flux stability without degrading the filter quality at the start of the new cycle.

Cake filtration performance may also be influenced by controlling the particles used to construct the cake. The size of the particles forming the filter cake have an effect both on the quality, i.e. ppm solids, and the quantity, i.e. flux, of the filtrate. Filtrate flux can be maximized by using larger particles to form at least the initial layers of the cake. When a cake is formed by relatively large diameter particles, the cake, interstitial volumes are maintained between the particles. In a cake formed by a mixture of large and small particles will tend to be more densely packed, with the smaller particles filling the interstitial volumes between the larger particles. It is through these interstitial volumes that the filtrate must pass. Thus, the larger interstitial volumes in a cake formed primarily from larger particles will offer a greater permeability than a cake formed from a mixture of both large and small particles.

Figure 6:
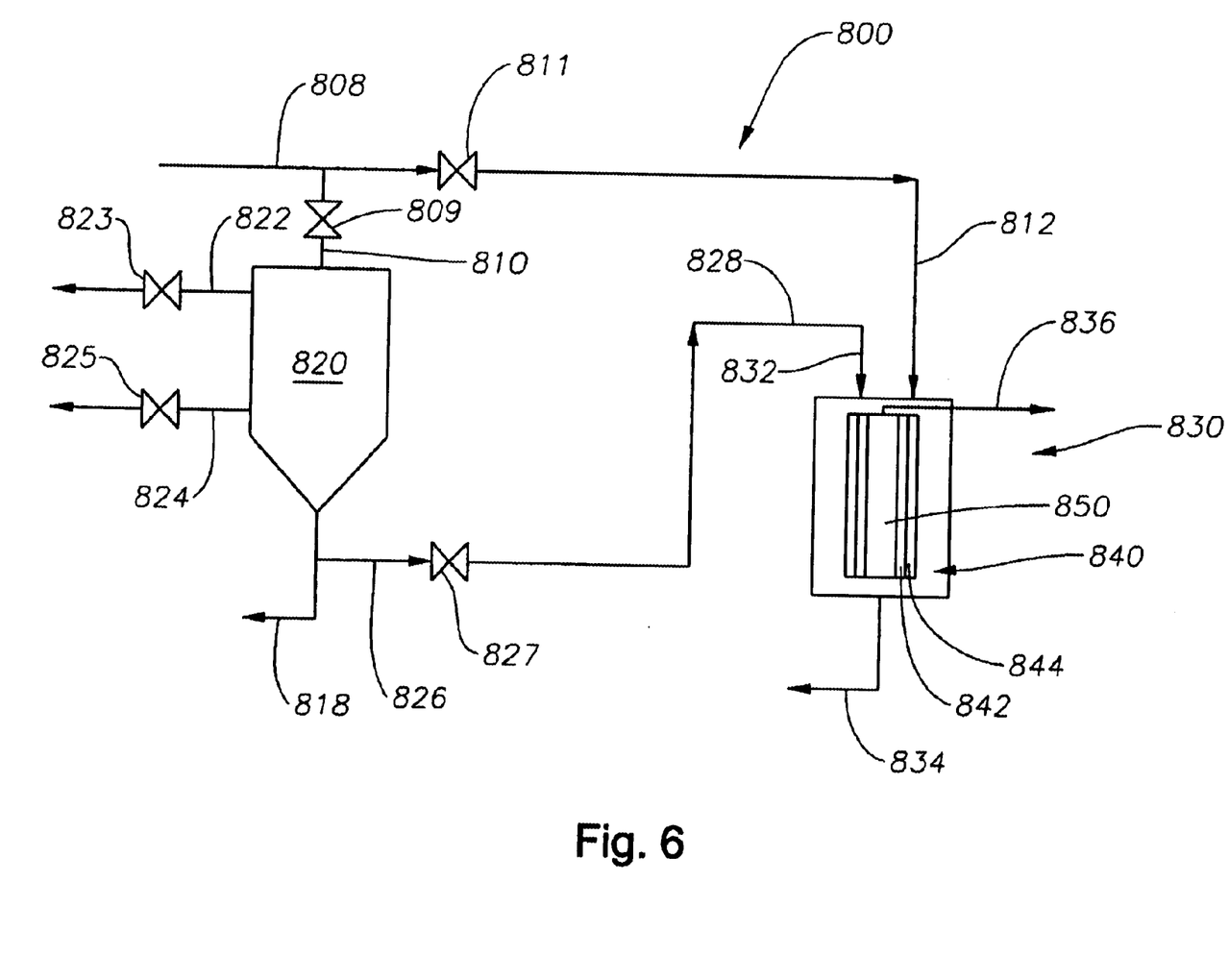
FIG. 6 is a schematic representation of one embodiment of a filtration system.

FIG. 6 shows one system for building a filter cake formed primarily of larger particles. Solid/liquid separation system 800 includes a slurry inlet 810 and slurry outlets 826 and 818. The slurry fed to system 800 through inlet 810 is withdrawn from a Fischer-Tropsch reactor (not shown) through line 808 to supply slurry to a settler 820, which feeds slurry to a filtration system 830. Valve 809 can be used to modify the slurry flow rate fed to settler 820. Filtration system 830 can be fed with slurry coming from the bottom of the settler through outlet 836 or with slurry from the FT reactor through line 812 or a combination of both. Settler 820 includes a plurality of outlets 822, 824, 826 each adapted to draw slurry from a different vertical location in settler 820. The closer the outlet is to the bottom of settler 820, the higher the concentration of large catalyst particles.

Thus, in FIG. 6, outlet 822 has the smallest concentration of large catalyst particles and outlet 826 has the highest concentration of large particles. The streams from outlets 822 and 824 contain much less amount of solids that slurry streams in 810, 811, 818, 826 and 834. Also, the solids in 822 and 824 are of a smaller size than the solids in the other streams. The streams 822 and 824 can be directed either back to the FT reactor or to a filtration system that may be called also polishing filters, not shown, which eliminates or minimizes the solids content of the these streams before these streams are used in another areas of the plant. The flow from each outlet 822, 824, and 826 can be controlled by valves 823, 825, and 827.

Filter housing 830 included slurry inlets 812 and 832, slurry outlet 834, filter medium 840, and filtrate outlet 836. Filter medium 840 surrounds a filtrate chamber 850 and comprises a substrate 842 onto which a filter cake 844 is formed. The buildup of filter cake 844 on substrate 842 can be regulated by controlling the velocity of the slurry flowing through housing 830 by any of the methods previously discussed. In operation, a pressure differential is maintained across filter medium 840, drawing a portion of the liquid component of the slurry into the filtrate chamber 850 while the solid portion of the slurry is separated by the filter medium 840 and returned to the reactor through slurry outlet 834.

The operation of system 800 may include initiating operation of the filtration system 830 with a slurry stream 828 having a high concentration of large diameter particles, such as from outlet 826. Once a filter cake 844 has been formed on substrate 842, the filtration system can be fed with at least a portion of the slurry from the FT reactor through inlet 812. After a certain period of time it may be necessary to partially remove the filter cake 844, which can be done by any of the methods disclosed in this invention. Also, after certain time the filtrate flow rate through outlet 836 may reach a predetermined minimum at which point the filter cake needs to be completely removed and then a new cycle of operation for system 800 is started by reforming the cake with slurry stream 828 as explained above.

The embodiments and examples set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A method for producing a filtrate of low solid content from a slurry stream from a Fischer-Tropsch slurry bed reactor, the method comprising:
   a) providing a filter housing comprising a slurry chamber and a filtrate chamber separated by a filter medium comprising a filter cake disposed on a substrate, wherein the filter cake has a thickness and provides a substantial majority of the filtration activity;
   removing a slurry, comprising a liquid phase and a solid phase, from the linear velocity;
   c) applying a pressure differential between the slurry chamber and the filtrate chamber so as to form a filter cake comprising a portion of the slurry solid phase disposed on the substrate;
   d) permeating a portion of the slurry liquid phase through the filter cake and the substrate to generate a filtrate flux; and
   e) periodically performing a cake thickness reduction step.

2. The method according to claim 1 wherein at least a portion of the filter cake comprises particles from the slurry solid phase.

3. The method according to claim 1 wherein the substrate has a nominal rating and a fraction of slurry solid phase comprises particles having a size smaller than the substrate's nominal rating.

4. The method according to claim 1 wherein at least 95 weight percent of the particles fall within the range 10–200 um.

5. The method according to claim 1 wherein the slurry solid phase has a number average particle size between 20 and 50 um.

6. The method according to claim 1 wherein the slurry solid phase comprises from 5 to 25 vol % of the slurry.

7. The method according to claim 1 wherein the substrate comprises a medium selected from the group consisting of sintered woven wire-mesh media, sintered powered metal media, porous metal fiber, metal supported membranes, and wedged wire media.

8. The method according to claim 1 wherein the filtrate medium's filtrate flux is independent of substrate morphology.

9. The method according to claim 1 wherein the substrate has a cylindrical body with a longitudinal axis parallel to the direction of the slurry flow through the slurry chamber.

10. The method according to claim 1 wherein the slurry linear velocity is less than 5.0 ft/sec.

11. The method according to claim 1 wherein the slurry linear velocity is between 0.1 and 5.0 ft/sec.

12. The method according to claim 1 wherein the filtration system has a filtration flux of at least 0.2 gal/min/ft$^2$.

13. The method according to claim 1 wherein the liquid phase comprises hydrocarbons produced from Fischer-Tropsch synthesis and the solid phase comprises a catalyst active for Fischer-Tropsch synthesis.

14. The method according to claim 13 wherein the catalyst comprises at least one of cobalt, ruthenium, or iron.

15. The method according to claim 13 wherein the catalyst comprises a support selected from the group consisting of alumina, silica, titania, zirconia, and combinations thereof.

16. The method according to claim 1 wherein the pressure differential between the slurry chamber and the filtrate chamber is less than 30 psi.

17. The method according to claim 1 wherein the filtrate comprises less than 25 ppm by weight of solids after the cake is formed.

18. The method according to claim 1 wherein the filtrate comprises less than 10 ppm by weight of solids after the cake is formed.

19. The method according to claim 1 wherein the filtrate comprises less than 5 ppm by weight of solids after the cake is formed.

20. The method according to claim 1 wherein the thickness of the cake is partially reduced by stopping the filtrate flow and maintaining the slurry flow through the slurry chamber for at least 2 minutes.

21. The method according to claim 1 wherein the thickness of the cake is partially reduced by increasing the linear velocity of the slurry for a period of at least 2 minutes.

22. The method according to claim 1 wherein step (d) lasts at least 2 hours.

23. The method according to claim 1 wherein step (d) lasts at least 4 hours.

24. A method for operating a filtration system of a Fischer-Tropsch slurry bed reactor system with a long cycle time comprising:
   a) providing a filtration housing comprising a slurry chamber and a filtrate chamber separated by a filter medium comprising a filter cake disposed on a substrate, wherein the filter cake has a thickness and provides a substantial majority of the filtration activity;
   b) removing a slurry, comprising a liquid phase and a solid phase, from a reactor, degassing the slurry, and passing at a slurry linear velocity through the slurry chamber;
   c) applying a pressure differential between the slurry chamber and the filtrate chamber so as to form a filter cake comprising a portion of the slurry solid phase disposed on the substrate;
   d) permeating a portion of the slurry liquid phase through the filter cake and the substrate to generate a filtrate flux;
   e) periodically performing a cake thickness reduction step;
   f) removing the filter cake after performing several cake thickness reduction steps (e); and
   g) repeating steps b through f.

25. The method according to claim 24 wherein step g is performed by at least one technique selected from the group consisting of reversing the filtrate flow across the substrate, stopping filtrate flow while continuing slurry flow through the slurry chamber, and passing a gas stream from the filtrate chamber to the slurry chamber.

26. The method according to claim 24 wherein the thickness of the cake is partially reduced by stopping the filtrate flow and maintaining the slurry flow through the slurry chamber for at least 2 minutes.

27. The method according to claim 24 wherein the thickness of the cake is partially reduced by increasing the linear velocity of the slurry for a period of at least 2 minutes.

28. The method according to claim 24 wherein at least a portion of the filter cake comprises particles from the slurry solid phase.

29. The method according to claim 24 wherein the substrate has a nominal rating and a fraction of slurry solid phase comprises particles having a size smaller than the substrate's nominal rating.

30. The method according to claim 24 wherein at least 95 weight percent of the particles fall within the range 10–200 um.

31. The method according to claim 24 wherein the slurry solid phase has a number average particle size between 20 and 50 um.

32. The method according to claim 24 wherein the slurry solid phase comprises from 5 to 25 vol % of the slurry.

33. The method according to claim 24 wherein the substrate comprises a medium selected from the group consisting of sintered woven wire-mesh media, sintered powered metal media, porous metal fiber, metal supported membranes, and wedged wire media.

34. The method according to claim 24 wherein the filtrate medium's filtrate flux is independent of substrate morphology.

35. The method according to claim 24 wherein the substrate has a cylindrical body with a longitudinal axis parallel to the direction of the slurry flow through the slurry chamber.

36. The method according to claim 24 wherein the slurry linear velocity is less than 5.0 ft/sec.

37. The method according to claim 24 wherein the slurry linear velocity is between 0.1 and 5.0 ft/sec.

38. The method according to claim 24 wherein the filtration system has a filtration flux of at least 0.2 gal/min/ft$^2$.

39. The method according to claim 24 wherein the liquid phase comprises hydrocarbons produced from Fischer-Tropsch synthesis and the solid phase comprises a catalyst active for Fischer-Tropsch synthesis.

40. The method according to claim 39 wherein the catalyst comprises at least one of cobalt, ruthenium, or iron.

41. The method according to claim 39 wherein the catalyst comprises a support selected from the group consisting of alumina, silica, titania, zirconia, and combinations thereof.

42. The method according to claim 24 wherein the pressure differential between the slurry chamber and the filtrate chamber is less than 30 psi.

43. The method according to claim 24 wherein the filtrate comprises less than 25 ppm by weight of solids after the cake is formed.

44. The method according to claim 24 wherein the filtrate comprises less than 10 ppm by weight of solids after the cake is formed.

45. The method according to claim 24 wherein the filtrate comprises less than 5 ppm by weight of solids after the cake is formed.

46. The method according to claim 24 wherein step (d) lasts at least 2 hours.

47. The method according to claim 24 wherein step (d) lasts at least 4 hours.

48. A method for operating a filtration system comprising:
   flowing a slurry to a settler, wherein the slurry comprises a liquid phase and a solid phase, wherein the solid phase further comprises large diameter particles and small diameter particles;
   extracting from the settler a first portion of the slurry containing a high concentration of large diameter particles;
   passing the first portion of the slurry through a filter housing comprising a slurry chamber and a filtrate chamber separated by a filter medium comprising a substrate;
   applying a pressure differential between the slurry chamber and the filtrate chamber so as to form a filter cake comprising primarily large diameter particles disposed on the substrate, wherein the filter cake has a thickness and provides a substantial majority of the filtration activity;
   passing the slurry having both large and small diameter particles through the filter housing so as to permeate a portion of the slurry liquid phase through the filter cake and the substrate to generate a filtrate flux.

49. The method of claim 48 further comprising performing a cake thickness reduction operation to remove only a portion of the cake from the substrate.

50. The method according to claim 49 wherein the cake thickness reduction operation is performed by at least one technique selected from the group consisting of reversing the filtrate flow across the substrate, stopping filtrate flow while continuing slurry flow through the slurry chamber, and passing a gas stream from the filtrate chamber to the slurry chamber.

51. The method according to claim 49 wherein the cake thickness reduction operation includes stopping the filtrate flow and maintaining the slurry flow through the slurry chamber for at least 2 minutes.

52. The method according to claim 49 wherein the thickness of the cake is partially reduced by increasing the linear velocity of the slurry for a period of at least 2 minutes.

53. The method according to claim 49 further comprising removing the filter cake after performing several cake thickness reduction operations.

54. The method according to claim 48 wherein the substrate has a nominal rating and a fraction of slurry solid phase comprises particles having a size smaller than the substrate's nominal rating.

55. The method according to claim 48 wherein at least 95 weight percent of the particles fall within the range 10–200 um.

56. The method according to claim 48 wherein the slurry solid phase has a number average particle size between 20 and 50 um.

57. The method according to claim 48 wherein the slurry solid phase comprises from 5 to 25 vol % of the slurry.

58. The method according to claim 48 wherein the substrate comprises a medium selected from the group consisting of sintered woven wire-mesh media, sintered powered metal media, porous metal fiber, metal supported membranes, and wedged wire media.

59. The method according to claim 48 wherein the filtrate medium's filtrate flux is independent of substrate morphology.

60. The method according to claim 48 wherein the substrate has a cylindrical body with a longitudinal axis parallel to the direction of the slurry flow through the slurry chamber.

61. The method according to claim 48 wherein the slurry linear velocity is less than 5.0 ft/sec.

62. The method according to claim 48 wherein the slurry linear velocity is between 0.1 and 5.0 ft/sec.

63. The method according to claim 48 wherein the filtration system has a filtration flux of at least 0.2 gal/min/ft$^2$.

64. The method according to claim 48 wherein the liquid phase comprises hydrocarbons produced from Fischer-Tropsch synthesis and the solid phase comprises a catalyst active for Fischer-Tropsch synthesis.

65. The method according to claim 64 wherein the catalyst comprises at least one of cobalt, ruthenium, or iron.

66. The method according to claim 64 wherein the catalyst comprises a support selected from the group consisting of alumina, silica, titania, zirconia, and combinations thereof.

67. The method according to claim 48 wherein the pressure differential between the slurry chamber and the filtrate chamber is less than 30 psi.

68. The method according to claim 48 wherein the filtrate comprises less than 25 ppm by weight of solids after the cake is formed.

69. The method according to claim 48 wherein the filtrate comprises less than 10 ppm by weight of solids after the cake is formed.

70. The method according to claim 48 wherein the filtrate comprises less than 5 ppm by weight of solids after the cake is formed.

* * * * *

UNITED STATES PATENT AND TRADEMARK OFFICE
CERTIFICATE OF CORRECTION

PATENT NO. : 6,887,390 B2
DATED : May 3, 2005
INVENTOR(S) : Sergio R. Mohedas et al.

It is certified that error appears in the above-identified patent and that said Letters Patent is hereby corrected as shown below:

Column 13,
Line 64, "removing a slurry, comprising a liquid phase and a solid phase, from the linear velocity;" should be -- b) removing a slurry, comprising a liquid phase and a solid phase, from the reactor, degassing the slurry, and passing the slurry through the slurry chamber at a slurry linear velocity; --.

Column 15,
Line 15, the words -- the slurry -- should be added after the word "passing".

Signed and Sealed this

Sixth Day of September, 2005

JON W. DUDAS
*Director of the United States Patent and Trademark Office*